United States Patent
Gerdes et al.

(10) Patent No.: US 8,773,056 B2
(45) Date of Patent: Jul. 8, 2014

(54) FPDA CLOSED LOOP ELECTRIC DRIVES CONTROLS

(75) Inventors: Jesse Gerdes, Dunlap, IL (US); James Siegle, Peoria, IL (US); Mark Hartman, Peoria, IL (US); Aaron Luther Thomas, Dunlap, IL (US); Jackson Wai, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 93 days.

(21) Appl. No.: 13/493,602

(22) Filed: Jun. 11, 2012

(65) Prior Publication Data

US 2013/0328517 A1 Dec. 12, 2013

(51) Int. Cl.
*H02P 7/00* (2006.01)

(52) U.S. Cl.
USPC . 318/432; 318/701; 318/400.02; 318/400.07; 318/400.09; 318/400.15

(58) Field of Classification Search
USPC .......... 318/432, 701, 400.02, 400.07, 400.09, 318/400.15
See application file for complete search history.

(56) References Cited

U.S. PATENT DOCUMENTS

| | | | |
|---|---|---|---|
| 3,679,953 A | 7/1972 | Bedford | |
| 4,707,650 A | 11/1987 | Bose | |
| 5,923,141 A | 7/1999 | McHugh | |
| 5,982,117 A | 11/1999 | Taylor et al. | |
| 6,002,234 A * | 12/1999 | Ohm et al. | 318/729 |
| 6,028,402 A * | 2/2000 | Kumar et al. | 318/52 |
| 6,351,048 B1 | 2/2002 | Schob et al. | |
| 6,469,468 B1 | 10/2002 | Hatsuda et al. | |
| 6,853,163 B2 | 2/2005 | Slater | |
| 6,864,658 B1 | 3/2005 | Torrey et al. | |
| 6,982,537 B2 | 1/2006 | Islam et al. | |
| 7,250,734 B1 | 7/2007 | Iannello et al. | |
| 7,986,117 B2 * | 7/2011 | Yamamoto et al. | 318/400.26 |
| 8,018,185 B2 * | 9/2011 | Yamamoto et al. | 318/400.15 |
| 8,063,596 B2 * | 11/2011 | Imura | 318/400.09 |

(Continued)

FOREIGN PATENT DOCUMENTS

| | | |
|---|---|---|
| JP | 03015290 | 1/1991 |
| JP | 2010081782 | 4/2010 |

OTHER PUBLICATIONS

Peng Zhang, et al. "A Novel FPGA Based Off-line Control Strategy for SRM Integrated Vehicle Propulsion System", Department of Electrical and Computer Engineering, Concordia University, Montreal, Quebec, Canada, Jul. 9, 2009.

(Continued)

*Primary Examiner* — Paul Ip
(74) *Attorney, Agent, or Firm* — Miller, Matthias & Hull

(57) ABSTRACT

A control system for a switched reluctance (SR) machine is provided. The control system may include a converter circuit that is operatively coupled to the SR machine, and a controller in communication with the converter circuit. The controller may be configured to execute two or more processes in parallel, wherein the processes include generating a torque command based on one or more of bus voltage, machine current, rotor speed and rotor position, determining a first set of current control parameters based on the torque command and the rotor speed, determining a second set of current control parameters based on one or more of the torque command, the rotor speed and the rotor position, selecting one of the first and second sets of current control parameters based on the rotor speed, and operating the gates according to the selected set of current control parameters.

32 Claims, 11 Drawing Sheets

(56) References Cited

U.S. PATENT DOCUMENTS

| | | | |
|---|---|---|---|
| 8,288,980 B2* | 10/2012 | Yamamoto et al. | 318/432 |
| 8,427,088 B2* | 4/2013 | Imura et al. | 318/400.07 |
| 2009/0237021 A1* | 9/2009 | Yamamoto et al. | 318/400.15 |
| 2009/0237022 A1* | 9/2009 | Yamamoto et al. | 318/400.26 |
| 2009/0322264 A1* | 12/2009 | Imura | 318/400.09 |
| 2011/0006711 A1* | 1/2011 | Imura et al. | 318/400.07 |
| 2011/0298403 A1* | 12/2011 | Yamamoto et al. | 318/400.02 |
| 2012/0139460 A1* | 6/2012 | Senkou et al. | 318/400.02 |

OTHER PUBLICATIONS

S. Vijayan, et al. "Intelligent speed controller for a Switched Reluctance Motor drive using FPGA", International Journal of Intelligent Systems Technologies and Applications, vol. 7, Issue 4, Sep. 2009, pp. 414-429, Geneva, Switzerland, 2009.

Kjaer, P.C., et al. "Very high bandwidth digital current controller for high-performance motor drives", pp. 185-190, SPEED Laboratory, University of Glasgow, UK, Sep. 23-25, 1996.

* cited by examiner

FPDA CLOSED LOOP ELECTRIC DRIVES CONTROLS

TECHNICAL FIELD

The present disclosure relates generally to switched reluctance machines, and more particularly, to systems and methods of controlling electric drives of switched reluctance machines.

BACKGROUND

With the growing interest in energy conservation, increasingly more machines, such as mobile industrial work machines or stationary power generation machines, are supplied with electric drive assemblies or systems for operating various tools or functions of the machine. Ongoing developments in electric drives have made it possible for electrically driven machines to effectively match or surpass the performance of mechanically driven machines while requiring significantly less fuel and overall energy. As electric drives become increasingly more commonplace with respect to such machines, the demand for more efficient generators and techniques for controlling same has also increased.

Among the various types of electrically driven machines available for use with such electric drives, switched reluctance (SR) machines have received great interest for being robust, cost-effective, and overall, more efficient. An SR machine is typically used to convert mechanical power received from a primary power source, such as a combustion engine, into electrical power for performing one or more operations of the machine. Additionally, an SR machine may be used to convert electrical power stored within a common bus or storage device into mechanical power. SR machines can similarly be used in conjunction with other generic power sources, such as batteries, fuel cells, and the like. Still further, SR machines can also be used with stationary machines having conventional power sources such as windmills, hydroelectric dams, or any other generic power source commonly used for stationary applications. While currently existing systems and methods for controlling SR machines may provide adequate control, there is still much room for improvement.

A typical SR machine essentially includes a multi-phase stator that is electrically coupled to an electric drive circuit, and a rotor that is rotatably positioned within the stator. In a motoring mode of operation, the electric drive selectively enables switches or gates associated with each phase of the stator so as to cause electromagnetic interactions between the stator and rotor poles and rotate the rotor relative to the stator at a desired torque and/or speed. Alternatively, in a generating mode of operation, the electric drive may be configured to receive any electrical power which may be induced by mechanical rotations of the rotor relative to the stator. The electric drive may use the electrical power that is induced during the generating mode to power auxiliary or accessory devices of the associated work machine, or in some cases, store the electrical power in an energy storage device.

Control of the SR machine, and thus, of the electric drive typically begins at a programmable microprocessor. More specifically, a microprocessor is preprogrammed with an algorithm which monitors various parameters of the machine and transmits different instructions to the electric drive for controlling the SR machine according to changes in the parameters detected. Such closed loop processes are executed at predefined rates that are essentially limited by the capabilities of the microprocessor and the manner by which the algorithm is implemented by the microprocessor. However, as the demand for more efficient and higher performance SR machines continues to grow, so does the demand for more efficient algorithm implementations and controllers with greater bandwidth.

Accordingly, there is a need to improve the performance capabilities and efficiency of an SR machine. Moreover, there is a need to improve overall control of electric drives, and thus, the manner by which SR machines are operated. More particularly, there is a need to improve upon the operating bandwidth of conventional controllers associated with SR machines.

SUMMARY OF THE DISCLOSURE

In one aspect of the present disclosure, a control system for a switched reluctance (SR) machine having a rotor and a stator is provided. The control system may include a converter circuit operatively coupled to the stator and including a plurality of gates in selective communication with each phase of the stator, and a controller in communication with each of the stator and the converter circuit. The controller may be configured to execute two or more processes in parallel. The processes may include generating a torque command based on one or more of bus voltage, machine current, rotor speed and rotor position, determining a first set of current control parameters based on the torque command and the rotor speed, determining a second set of current control parameters based on one or more of the torque command, the rotor speed and the rotor position, selecting one of the first and second sets of current control parameters based on the rotor speed, and operating the gates according to the selected set of current control parameters.

In a refinement, the controller may be configured to execute at least the processes of determining the first set of current control parameters and determining the second set of current control parameters in parallel.

In another refinement, the controller may be at least partially implemented using one or more of a field programmable gate array (FPGA) and an application specific integrated circuit (ASIC) configured to facilitate parallel processing and substantially reduce loop times.

In another refinement, the controller may generate the torque command based on one or more comparisons between the observed bus voltage, machine current, rotor speed and rotor position and the desired bus voltage, machine current, rotor speed and rotor position, respectively.

In a related refinement, the controller may further generate a torque request based on the one or more comparisons, limit the torque request based on the rotor speed, and generate the torque command based on the limited torque request.

In another refinement, the controller may be configured to generate the torque command in one of a closed loop control mode and an open loop control mode.

In another refinement, each of the first and second sets of current control parameters may include a current target, a maximum current target, a theta-on angle and a theta-off angle.

In another refinement, the controller may determine the first set of current control parameters by determining current control parameters best suited for each of a motoring mode of operation and a generating mode of operation, determining the mode of operation of the SR machine based on the torque command and the rotor speed, and selecting the current control parameters corresponding to the detected mode of operation.

In another refinement, the stator may be a three-phase stator. The second set of current control parameters may include a fixed theta-on angle of 180° and a fixed theta-off angle of 360° for a first phase of the stator if the SR machine is in a motoring mode of operation, and include a fixed theta-on angle of 0° and a fixed theta-off angle of 180° for the first phase of the stator if the SR machine is in a generating mode of operation. The corresponding theta-on and theta-off angles for a second phase of the stator may be shifted by 120° and the corresponding theta-on and theta-off angles for a third phase of the stator may be shifted by 240°.

In another refinement, the controller may generate the second set of current control parameters by scaling the torque command for each phase of the stator based on one or more of the rotor speed, the rotor position and a preprogrammed torque sharing function, and generate a current target for each phase of the stator based on one or more of the scaled torque command, the rotor speed, the rotor position and a predefined lookup map. The torque sharing function may be configured to modify the current in each phase of the stator in a manner which more evenly distributes torque production therebetween and minimizes torque ripple.

In yet another refinement, the controller may compare an absolute value of the rotor speed to a plurality of rotor speed thresholds configured to establish at least a first speed region and a second speed region. The controller may select the first set of current control parameters for controlling the SR machine if the rotor speed falls within the first speed region, and the controller may select the second set of current control parameters for controlling the SR machine if the rotor speed falls within the second speed region.

In accordance with another aspect of the present disclosure, a current controller for an electric drive of an SR machine having a rotor and a stator is provided. The current controller may include a torque control module configured to generate a torque command based on one or more of bus voltage, machine current, rotor speed and rotor position; an average torque control module configured to determine a first set of current control parameters based on the torque command and the rotor speed; a current profiling module configured to determine a second set of current control parameters based on one or more of the torque command, the rotor speed and the rotor position; a control select module configured to select one of the first and second sets of current control parameters based on the rotor speed; and a current control module configured to selectively drive a plurality of gates associated with each phase of the stator according to the selected set of current parameters.

In a refinement, at least the torque control module, the average torque control module and the current profiling module are implemented using one of an FPGA and an ASIC configured to facilitate parallel processing thereof and substantially reduce loop times.

In another refinement, the torque control module may compare one or more of the observed bus voltage, machine current, rotor speed and rotor position to one or more of the desired bus voltage, machine current rotor speed and rotor position, respectively. The torque control module may further generate a torque request based on the one or more comparisons, limit the torque request based on the rotor speed, and generate a torque command based on the limited torque request.

In another refinement, the average torque control module may determine current control parameters best suited for each of a motoring mode of operation and a generating mode of operation, determine the mode of operation of the SR machine based on the torque command and the rotor speed, and select the current control parameters corresponding to the detected mode of operation.

In another refinement, the current profiling module may be configured to output fixed theta-on and theta-off angles for each phase of the stator based on a detected mode of operation of the SR machine.

In another refinement, the stator may be a three-phase stator. The current profiling module may be configured to output a fixed theta-on angle of 180° and a fixed theta-off angle of 360° for a first phase of the stator if the SR machine is in a motoring mode of operation, and output a fixed theta-on angle of 0° and a fixed theta-off angle of 180° for the first phase of the stator if the SR machine is in a generating mode of operation. The corresponding theta-on and theta-off angles for a second phase of the stator may be shifted by 120° and the corresponding theta-on and theta-off angles for a third phase of the stator may be shifted by 240°.

In another refinement, the current profiling module may be preprogrammed with a torque sharing function configured to modify the current in each phase of the stator in a manner which more evenly distributes torque production therebetween and minimizes torque ripple. The current profiling module may be configured to scale the torque command for each phase of the stator based on one or more of the rotor speed, the rotor position and the torque sharing function, and generate a current target for each phase of the stator based on one or more of the scaled torque command, the rotor speed, the rotor position and a predefined torque-speed-position lookup map.

In another refinement, the control select module may compare an absolute value of the rotor speed to a plurality of rotor speed thresholds configured to establish at least a first speed region and a second speed region. The control select module may select the first set of current control parameters for controlling the SR machine if the rotor speed falls within the first speed region, and the control select module may select the second set of current control parameters for controlling the SR machine if the rotor speed falls within the second speed region.

In yet another refinement, the torque control module may be operated in one of a closed loop control mode and an open loop control mode.

In yet another aspect of the present disclosure, a method of controlling an SR machine having a rotor and a stator is provided. The method may include the steps of determining one or more of bus voltage, machine current, rotor speed and rotor position of the SR machine; generating a torque command based on one or more of the bus voltage, the machine current, the rotor speed and the rotor position; determining a first set of current control parameters based on the torque command and the rotor speed; determining a second set of current control parameters based on one or more of the torque command, the rotor speed and the rotor position; selecting one of the first and second sets of current control parameters based on the rotor speed; and selectively driving a plurality of gates associated with each phase of the stator according to the selected set of current control parameters.

In a refinement, at least the steps of determining the first set of current control parameters and determining the second set of current control parameters may be performed in parallel.

In another refinement, the step of generating the torque command may be performed in one of a closed loop control mode and an open loop control mode.

In another refinement, the step of generating the torque command may further include comparing one or more of the observed bus voltage, machine current, rotor speed and rotor position to one or more of the desired bus voltage, machine current rotor speed and rotor position, respectively, In a related refinement, the step of generating the torque command may further include generating a torque request based on the one or more comparisons, limiting the torque request based on the rotor speed, and generating a torque command based on the limited torque request.

In another refinement, each of the first and second sets of current control parameters may include a current target, a maximum current target, a theta-on angle and a theta-off angle.

In another refinement, the step of determining the first set of current control parameters may further include determining current control parameters best suited for each of a motoring mode of operation and a generating mode of operation, determining the mode of operation of the SR machine based on the torque command and the rotor speed, and selecting the current control parameters corresponding to determined mode of operation.

In another refinement, the first set of current control parameters may be determined based on torque-speed lookup maps, and the second set of current control parameters may be determined based on torque-speed-position lookup maps.

In another refinement, the second set of current control parameters may include fixed theta-on and theta-off angles for each phase of the stator, and the controller may determine the fixed theta-on and theta-off angles based on a detected mode of operation of the SR machine.

In another refinement, the stator may be a three-phase stator. The second set of current control parameters may include a fixed theta-on angle of 180° and a fixed theta-off angle of 360° for a first phase of the stator if the SR machine is in a motoring mode of operation, and include a fixed theta-on angle of 0° and a fixed theta-off angle of 180° for the first phase of the stator if the SR machine is in a generating mode of operation. The corresponding theta-on and theta-off angles for a second phase of the stator may be shifted by 120° and the corresponding theta-on and theta-off angles for a third phase of the stator may be shifted by 240°.

In another refinement, the step of determining the second set of current control parameters may further include scaling the torque command for each phase of the stator based on one or more of the rotor speed, the rotor position and a preprogrammed torque sharing function, and generating a current target for each phase of the stator based on one or more of the scaled torque command, the rotor speed, the rotor position and a predefined torque-speed-position lookup map. The torque sharing function may be configured to modify the current in each phase of the stator in a manner which more evenly distributes torque production therebetween and minimizes torque ripple.

In yet another refinement, the step of selecting one of the first and second sets of current control parameters may further include comparing an absolute value of the rotor speed to a plurality of rotor speed thresholds configured to establish a first speed region and a second speed region. The first set of current control parameters may be selected to control the SR machine if the rotor speed falls within first speed region, and the second set of current control parameters may be selected to control the SR machine if the rotor speed falls within the second speed region.

DETAILED DESCRIPTION

Reference will now be made in detail to specific embodiments or features, examples of which are illustrated in the accompanying drawings. Generally, corresponding reference numbers will be used throughout the drawings to refer to the same or corresponding parts.

Figure 1:
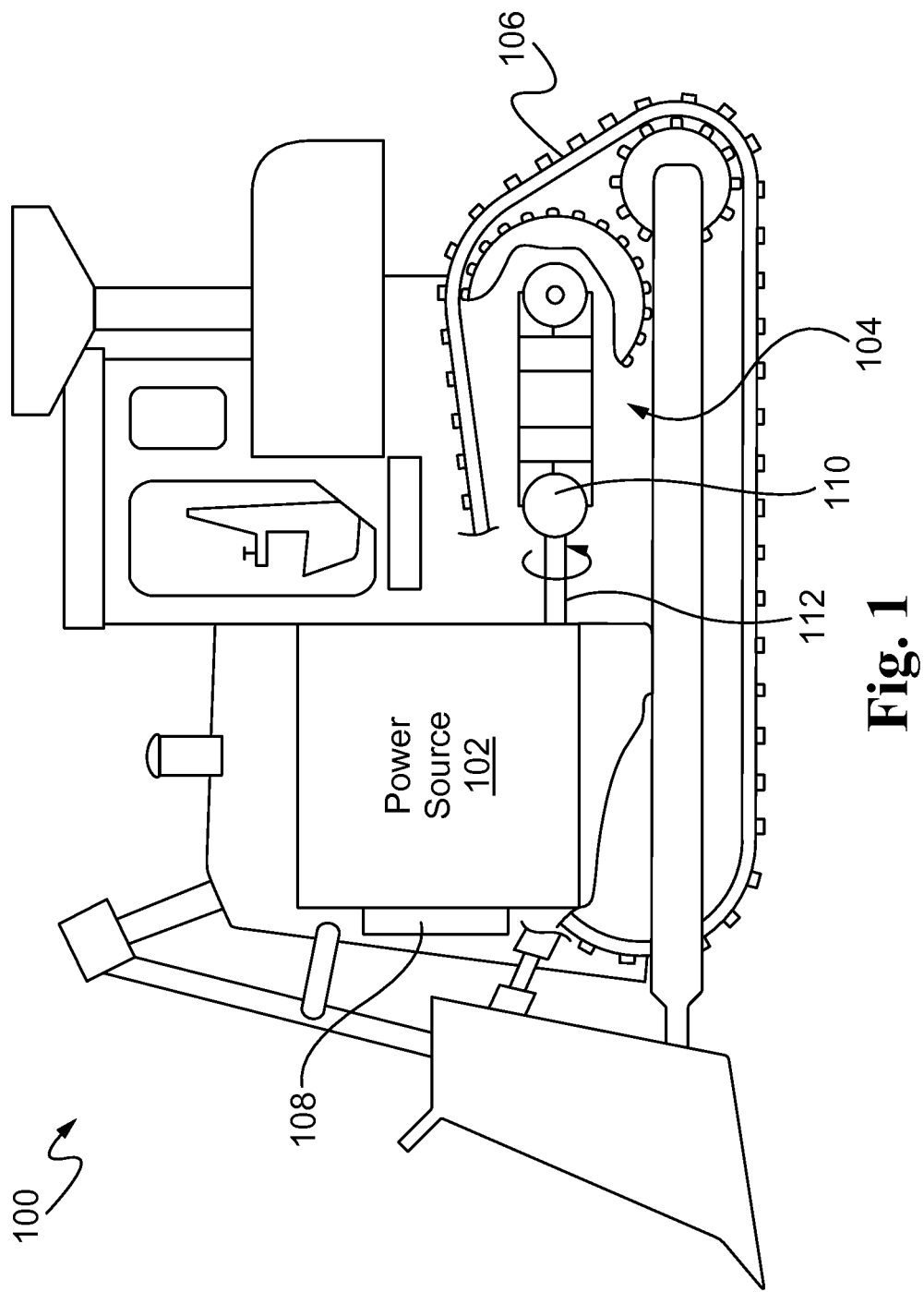
FIG. 1 is a diagrammatic view of one exemplary machine having an electric drive.

FIG. 1 diagrammatically illustrates one exemplary embodiment of a machine 100 that may employ electric drive means to generate electrical energy from mechanical energy or vice versa. In the particular embodiment of FIG. 1, for instance, the machine 100 may include a power source 102 coupled to an electric drive 104 for causing movement via a traction device 106. Moreover, the power source 102 may be configured to mechanically transmit power to an electric machine 110, such as a motor/generator, or the like, of the electric drive 104 via a coupling or axially rotating drive shaft 112. Such mobile machines 100 may be used as a work machine for performing a particular type of operation associated with an industry, such as mining, construction, farming, transportation, or any other suitable industry known in the art. For example, the mobile machine 100 may be an earth moving machine, a marine vessel, an aircraft, a tractor, an off-road truck, an on-highway passenger vehicle, or the like. In general, the power source 102 of the electric drive 104 may include, for example, a combustion engine, such as a diesel engine, a gasoline engine, or a natural gas engine, or alternatively, may employ batteries, fuel cells, or any other suitable power source. In alternative applications, the machine 100 may similarly be used in conjunction with other generic types of power sources, such as batteries, fuel cells, and the like. Furthermore, while the machine 100 of FIG. 1 may be illustrated as being mobile, the machine 100 may also be used to generate power in conjunction with stationary applications having, for instance, windmills, hydro-electric dams, or any other suitable means as a power source.

Figure 2:
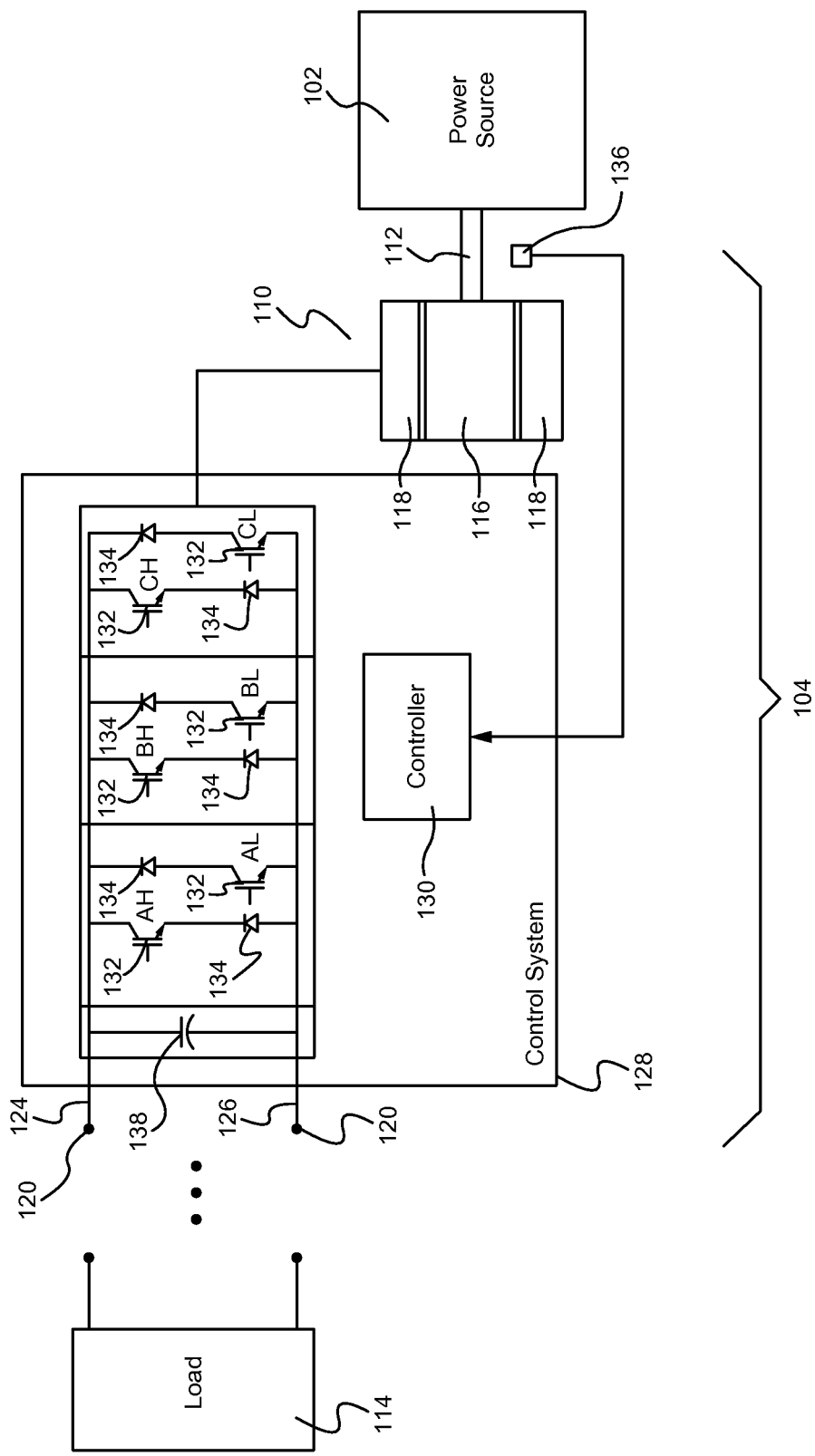
FIG. 2 is a schematic view of one exemplary control system for controlling a switched reluctance (SR) machine constructed in accordance with the teachings of the present disclosure.

FIG. 2 schematically illustrates one exemplary electric drive 104 that may be employed to communicate power between the power source 102 and one or more electrical loads 114. The electric machine 110 of the electric drive 104 in FIG. 2 may be a switched reluctance (SR) machine, or the like, configured to produce electrical power in response to rotational input from the power source 102 and communicate the electrical power to one or more electrical loads 114 of the machine 100. The load 114 may include, for example, motors for causing motion of the machine 100 as well as motors for operating various mechanical tools of the machine 100. As is well known in the art, the SR machine 110 may include a rotor 116 that is rotatably disposed within a fixed stator 118. The rotor 116 may be coupled to an output of the power source 102 via the drive shaft 112, or in other related embodiments, via a direct crankshaft, a gear train, a hydraulic circuit, and the like. The stator 118 may be electrically coupled to a common bus 120 of the electric drive 104 via a converter circuit 122.

During a generating mode of operation, as the rotor 116 is rotated within the stator 118 by the power source 102, electrical current may be induced within the stator 118 and supplied to the converter circuit 122. The converter circuit 122 may in turn convert the electrical signals into an appropriate direct current (DC) voltage for distribution to the various electrical loads 114 of the machine 100. Additionally, the SR machine 110 may be enabled to cause rotation of the rotor 116 in response to electrical signals that are provided to the stator 118 from the common bus 120, for instance, during a motoring mode of operation. The common bus 120 may include a positive line 124 and a negative or ground line 126 across which a common DC bus voltage may be communicated to one or more loads 114 of the machine 100 coupled thereto. For instance, the converter circuit 122 may provide a DC signal to be transmitted through the common bus 120 and to a rectifier circuit where the DC voltage may be converted into the appropriate alternating current (AC) signals for driving the one or more traction motors, or the like, for causing motion of the machine 100 via the traction device 106. The common bus 120 may also communicate the common DC voltage to other loads 114 of the machine 100, such as a hybrid system, electrically driven pumps, electrically driven fans, and the like.

Still referring to FIG. 2, the electric drive 104 may also include a control system 128 for controlling the SR machine 110. The control system 128 may essentially include a controller 130 that is in communication with at least the converter circuit 122 associated with the electric drive 104. The converter circuit 122 may include a series of transistors or gated switches 132, such as insulated-gate bipolar transistors, and diodes 134 for selectively enabling one or more phase windings of the SR machine 110. A three-phase SR machine 110, for example, may be driven using a converter circuit 122 having six switches 132 and six diodes 134 for selectively enabling or disabling each of the three phase legs of the SR machine 110. Each of the switches 132 may be enabled or disabled via gate signals, which may be supplied by the controller 130. In particular modifications, the control system 128 may also be provided with encoders or sensors 136, such as rotor position sensors, rotor speed sensors, or the like, adapted to generate sensor signals corresponding to the rotational speed and/or position of the rotor 116 relative to the stator 118 and communicate the sensor signals to an input of the controller 130. The sensors 136 may include a variable reluctance sensor, a capacitance sensor, a Hall-effect sensor, an anisotropic magnetoresistance sensor, or the like. The sensors 136 may also include means for measuring any one or more of the bus voltage, the current through one or more phases of the stator 118 or the machine current, and the like. In further alternative modifications, any one or more of the rotor speed, the rotor position, the bus voltage and the machine current may be estimated or derived through sensorless means by the controller 130 rather than measured. Power to the control system 128 and the converter circuit 122 may be provided by an external or a secondary power source, such as provided by a battery (not shown), residual voltage stored in a capacitor 138 of the common bus 120, or any other suitable current-limited DC power supply.

Additionally, the controller 130 of FIG. 2 may include a programmable controller 130 configured to operate the SR machine 110 of the electric drive 104 according to a predetermined algorithm or set of instructions designed to optimize the performance of the machine 100 based on observed characteristics of the SR machine 110, the power source 102, the electric drive 104, and the like. Algorithms or sets of instructions and conditionals may be preprogrammed into a memory of the controller 130 by means commonly known in the art. Furthermore, as opposed to conventional controllers of the prior art which employ conventional microcontrollers or microprocessors for controlling electrically driven machines 100, the controller 130 of FIG. 2 may be implemented at least partially using a field programmable gate array (FPGA), an application specific integrated circuit (ASIC), or any other programmable controller capable of executing multiple closed loop processes simultaneously or in parallel. By employing such controllers with better throughput and enabling more parallel processes, the controller 130 as well as the closed loop control schemes preprogrammed therein may be configured in a manner which substantially increases the associated loop rate and promotes better machine performance.

Figure 3:
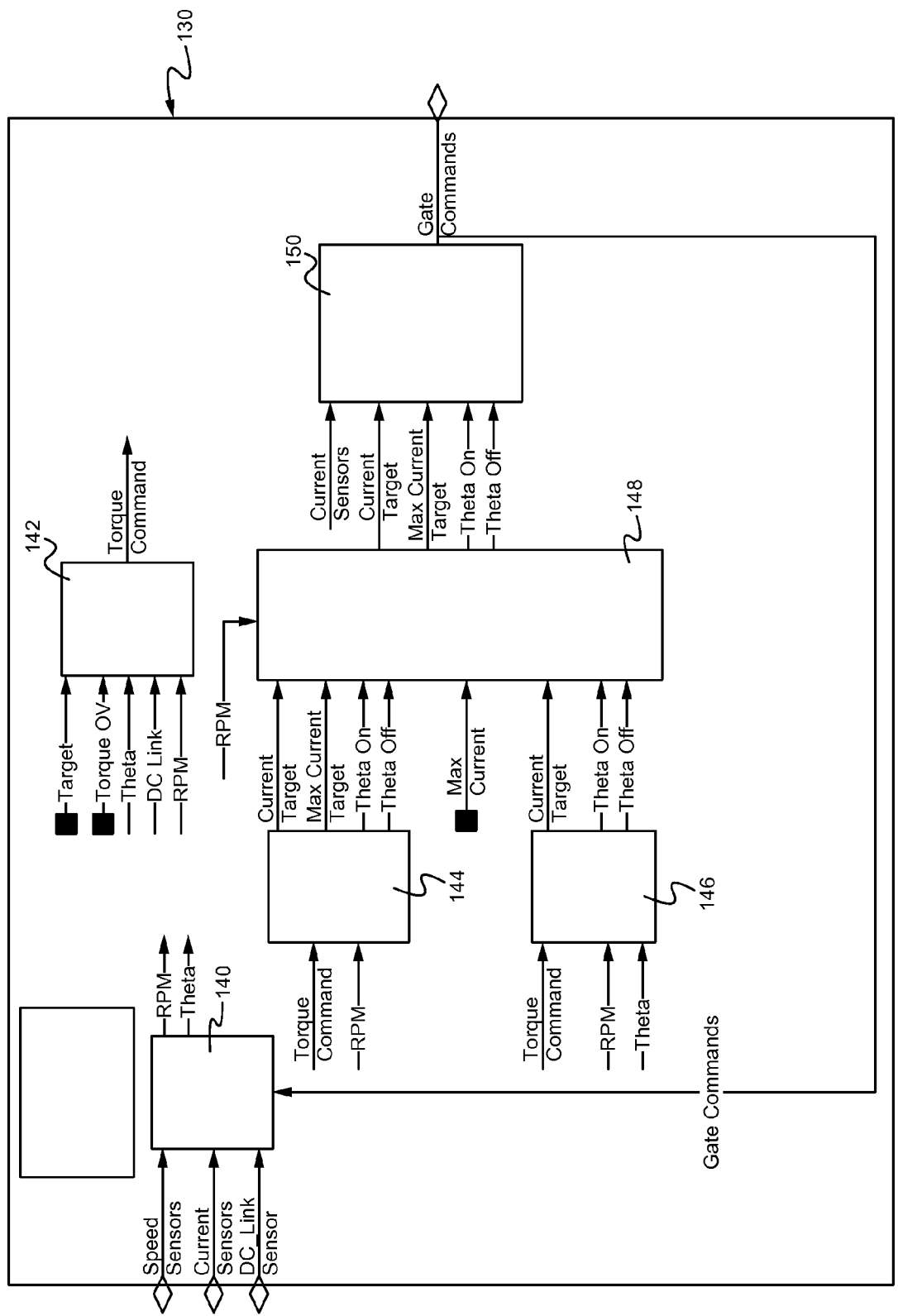
FIG. 3 is a schematic view of one exemplary field programmable gate array (FPGA) controller.

Referring now to FIG. 3, an exemplary embodiment of one such preprogrammed controller 130 is schematically disclosed. For example, the controller 130 may be implemented using an FPGA, as well as an ASIC, that is preprogrammed with an algorithm for controlling the electric drive 104 of a three-phase SR machine 110 and configured to function according to the modular schematic shown in FIG. 3. As shown, the FPGA controller 130 may be programmed to include, among other things, a sensor module 140, a torque control module 142, an average torque control module 144, a current profiling module 146, a control select module 148 and a current control module 150. By implementing the controller 130 using an FPGA, the controller 130 may be preprogrammed in a manner which facilitates parallel processing, thereby substantially increasing the overall loop rate. For example, the controller 130 may be preprogrammed to simultaneously perform at least the processes assigned to the average torque control module 144 and the current profiling module 146 in parallel per iteration. The controller 130 may similarly be implemented using an ASIC, or any other suitable controller adapted to facilitate parallel processing.

As shown in FIG. 3, the sensor module 140 may generally determine one or more parameters corresponding to, for example, the rotor speed, the rotor position, the machine current, the bus voltage, and the like, by collecting such information directly from sensors 136 distributed throughout the machine 100 or by internal derivations. The sensor module 140 may also monitor the gate command signals as they are being communicated between the controller 130 and the phases of the stator 118. Based on such feedback, the sensor module 140 may be configured to calculate at least the angular speed of the rotor 116 relative to the stator 118, or the rotor speed, as well as the angular position of the rotor 116 relative to the stator 118, or the rotor position. The sensor module 140 may also continuously update the rotor position and the rotor speed according to any observed changes such that any one or more of the modules of the controller 130 may reference and have access to the immediate rotor speed and/or position at any point during operation. As shown in FIG. 3, for example, the sensor module 140 may generate a first signal corresponding to rotor speed, in terms of revolutions per minute (RPM) to each of the torque control module 142, average torque control module 144 and the current select module 148. The sensor module 140 may also determine or generate a second signal corresponding to rotor position, for instance, in terms of an angular value, θ, to each of the torque control module 142 and the current profiling module 146.

Figure 4:
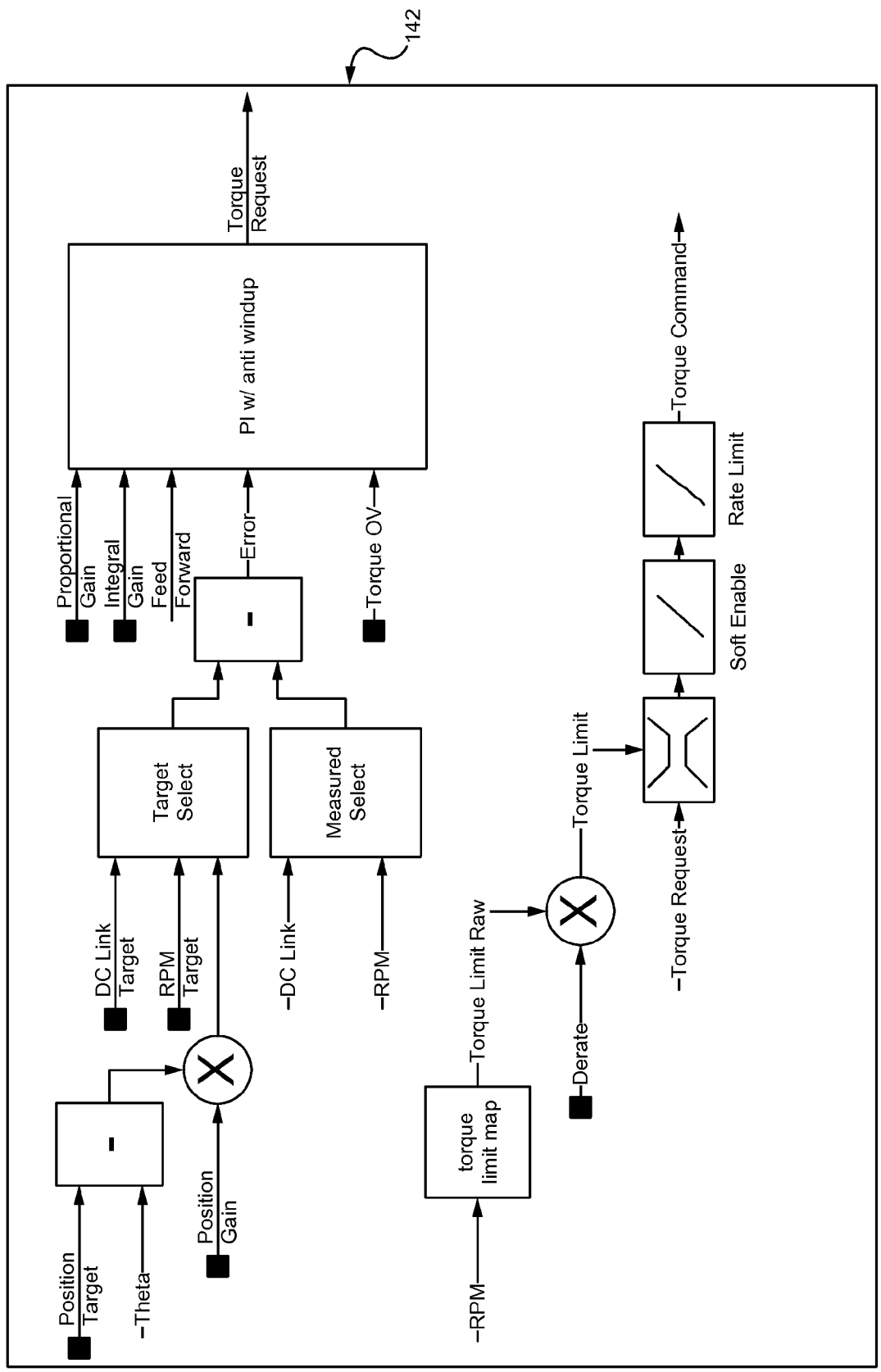
FIG. 4 is a schematic view of a torque control module associated with the FPGA controller of FIG. 3.

The torque control module 142 of FIG. 3 may be configured to generate a torque command signal based on one or more of the bus voltage, the machine current, the rotor speed and the rotor position as determined by the sensor module 140. More specifically, as shown in the schematic of FIG. 4, the torque control module 142 may compare any one or more of the observed bus voltage, machine current, rotor speed and rotor position to any one or more of the desired bus voltage, machine current, rotor speed and rotor position, respectively. Based on any one or more of the comparisons, the torque control module 142 may be able to quantify a difference or an error between the actual and the desired operational characteristics of the SR machine 110. The torque control module 142 may then forward the error to a closed loop feedback controller, such as a proportional-integral (PI) controller, or the like, in order to generate a torque request which corresponds to an appropriate correction to the error.

Additionally, the torque control module 142 may determine a torque limit with which to limit the torque request. For example, the torque control module 142 may determine a suitable raw torque limit based on the observed rotor speed and a preprogrammed torque limit lookup map and/or table. In other alternatives, the raw torque limit may similarly be derived using other parameters relevant to the SR machine 110, or combinations thereof, with the appropriate lookup maps and/or tables. The torque control module 142 may additionally apply a predefined derate value to the raw torque limit to generate a final torque limit to be applied to the torque request generated by the feedback controller. In other modifications, the torque control module 142 may also apply a limit on the rate of change of the torque, as well as any other suitable modification to the torque request prior to the final output. In still further modifications, the torque control module 142 may at times be operated in an open loop control mode rather than a closed loop control mode to generate the torque command and/or the torque request based on internally derived input parameters. Once all limits have been applied, the torque command may be communicated to each of the average torque control module 144 and the current profiling module 146 for further processing.

Figure 5:
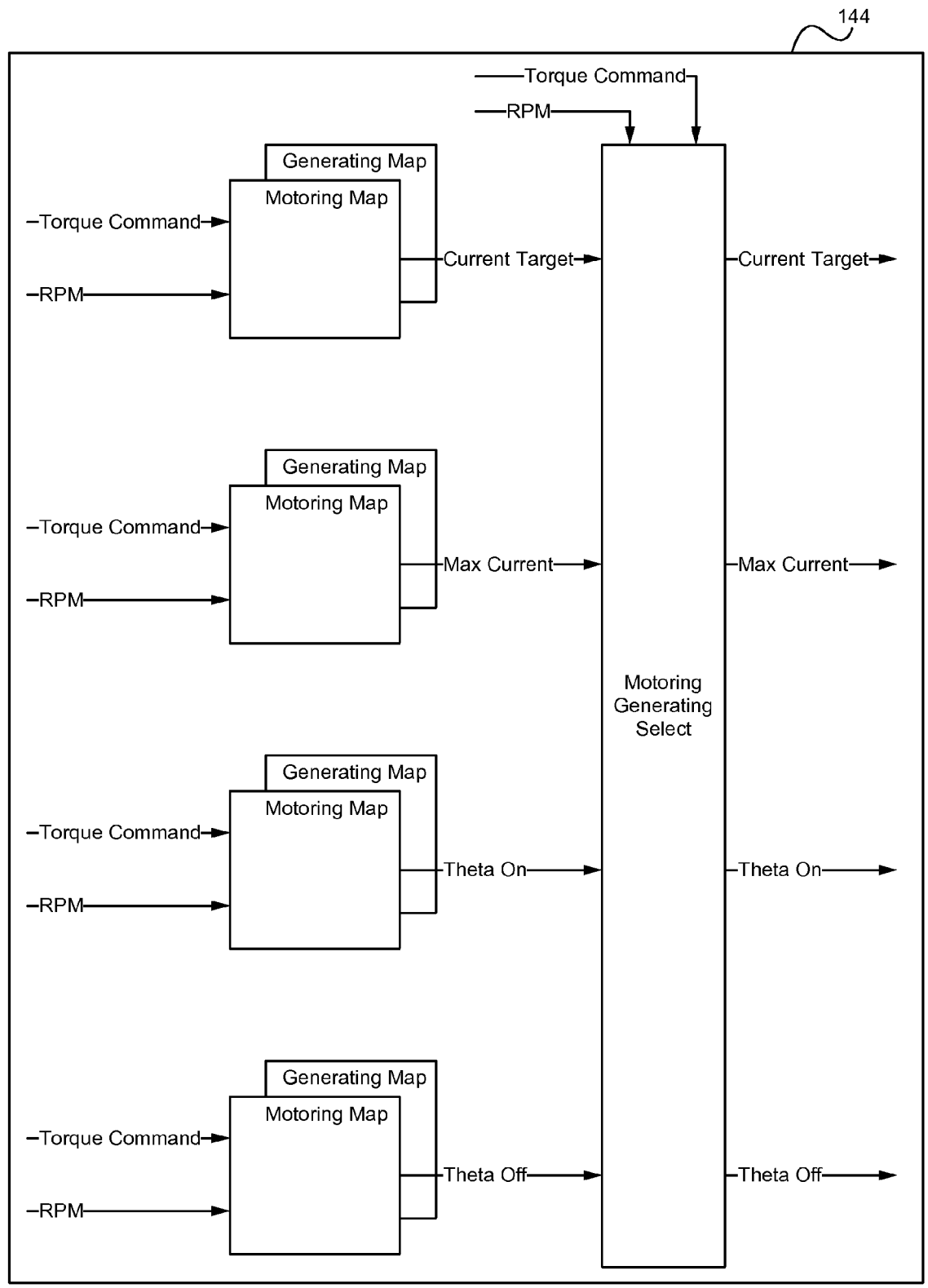
FIG. 5 is a schematic view of an average torque control module associated with the FPGA controller of FIG. 3.

Referring back to the FPGA controller 130 of FIG. 3, the average torque control module 144 may use the torque command provided by the torque control module 142 to generate a corresponding first set of current control parameters for controlling the SR machine 110. If enabled to do so, the average torque control module 144 may essentially control the torque production of the associated SR machine 110 by controlling the machine current over discrete conduction windows. The first set of current control parameters produced by the average torque control module 144 may be independent of rotor position but specific to the torque command and the observed rotor speed. As shown in FIG. 5, for example, the current control parameters may include at least a current target, a maximum current target, a theta-on angle and a theta-off angle. Moreover, the average torque control module 142 may apply a single current target for each phase of the associated SR machine 110 that is consistent for any given torque and rotor speed and unaffected by rotor position. This position-independent current target may correspond to the average current that a current regulator of the associated electric drive 104 may attempt to achieve during operation of the SR machine 110. Similarly, the average torque control module 144 may define a consistent set of theta-on/off angles for each phase of the SR machine 110, where the theta-on/off angles are appropriately shifted for each phase. In applications directed to a three-phase SR machine 110, for example, the theta-on/off angles defined for one phase may simply be shifted by 120° for the second phase and shifted by 240° for the third phase.

As demonstrated in FIG. 5, the average torque control module 144 may individually generate each of the current target, the maximum current target and the theta-on/off angles based on the torque command, the observed rotor speed and a plurality of preprogrammed torque-speed lookup maps. The average torque control module 144 may further be preconfigured with two different sets of torque-speed lookup maps including, for instance, one set of maps directed to a motoring mode of operation of the SR machine 110, and another set of maps directed to a generating mode of operation. The lookup maps may be optimized for different control results including, for instance, maximum efficiency, minimum torque ripple, or any combination thereof. In alternative modifications, the average torque control module 144 may similarly employ torque-speed lookup tables rather than lookup maps, or any other suitable programmable reference. Furthermore, the FPGA controller 130 may be configured such that the lookup process for each of the current target, the maximum current target and the theta-on/off angles may be executed simultaneously or in parallel. Additionally, the corresponding set of outputs for each of the motoring and generating modes of operation may similarly be generated in parallel so as to provide two possible sets of outputs per iteration.

Figure 6:
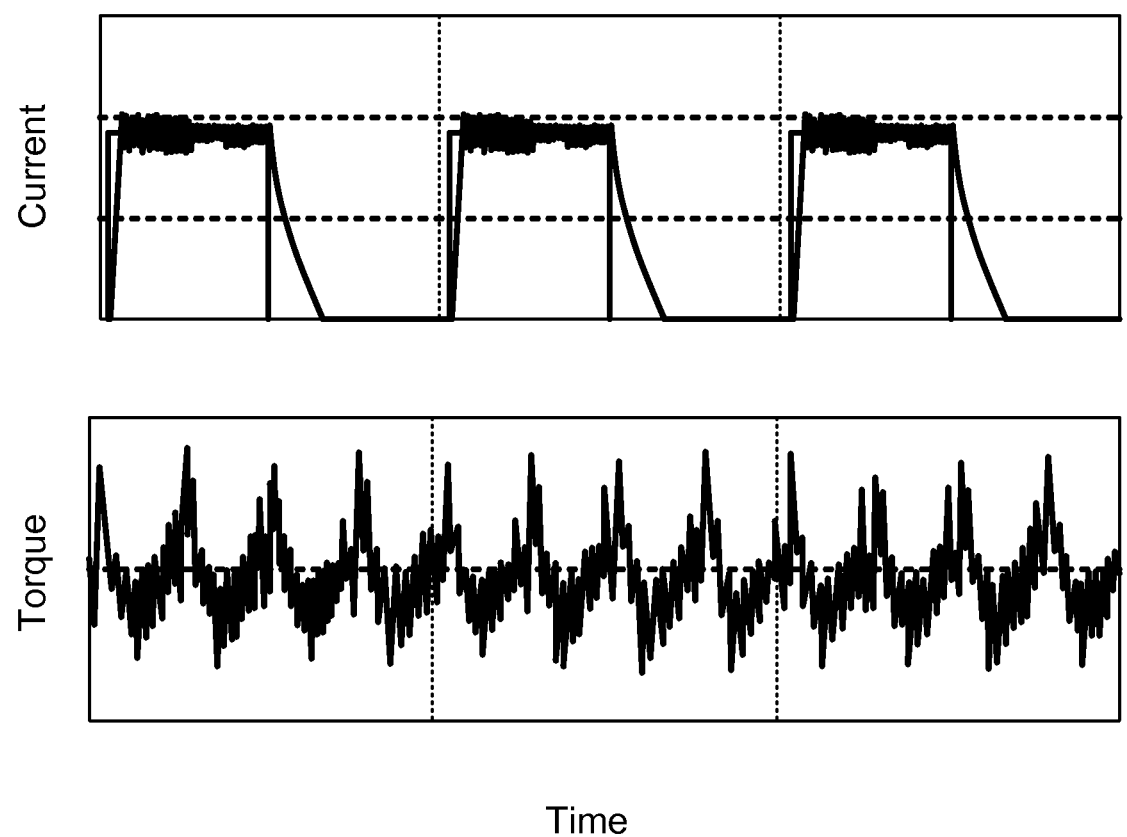
FIG. 6 is a graphical view of the machine current and the output torque of an SR machine being operated in part by the average torque control module of FIG. 5.

Once both possible output sets have been established, the average torque control module 144 may further be configured to detect the present operating mode of the associated SR machine 110 based on the torque command, as determined by the torque control module 142, and the rotor speed, as determined by the sensor module 140. For example, if the SR machine 110 is detected to be operating in a motoring mode, the average torque control module 144 may output the current control parameters determined using the motoring maps. Alternatively, if the SR machine 110 is detected to be operating in a generating mode, the average torque control module 144 may output the current control parameters determined using the generating maps. If ultimately enabled to use the first set of current control parameters for controlling the SR machine 110, the SR machine 110 may exhibit a machine current and an output torque approximately corresponding to the waveforms illustrated in FIG. 6 for example. As shown, the output torque of an SR machine 110 being controlled by the average torque control module 144 may exhibit certain levels of torque ripple, even while using torque-speed maps specifically optimized for minimum torque ripple. This is because the phases may not consistently overlap and because the constant current target that is used to control the SR machine 110 may not generate a constant torque. While generally acceptable, such levels of torque ripple may be unsuitable for certain operating conditions. Accordingly, the controller 130 may simultaneously employ the current profiling module 146 to generate controls adapted to further reduce the torque ripple.

As the average torque control module 144 generates the first set of current control parameters, the current profiling module 146 of FIG. 3 may be configured to concurrently generate a second set of current control parameters based on the torque command generated by the torque control module 142 and the rotor position as determined by the sensor module 140. In other related modifications, the current profiling module 146 may also generate the second set of current control parameters based at least partially on rotor speed. The current profiling module 146 may serve to minimize torque ripple by shaping the current of each phase in a manner which more evenly distributes torque production between the phases of the SR machine 110. The current control parameters generated by the current profiling module 146 may be configured to include at least a current target value, a theta-on angle and a theta-off angle. While the maximum current target was referenced from lookup maps in the average torque control module 144, the current profiling module 146 may define a maximum current target based on user input, preset values, or the like. In further contrast to the average torque control module 144, the current targets generated by the current profiling module 146 may be independent for each phase of the SR machine 110 and varied based on the rotor position, or in some cases, based also on the rotor speed.

Figure 7:
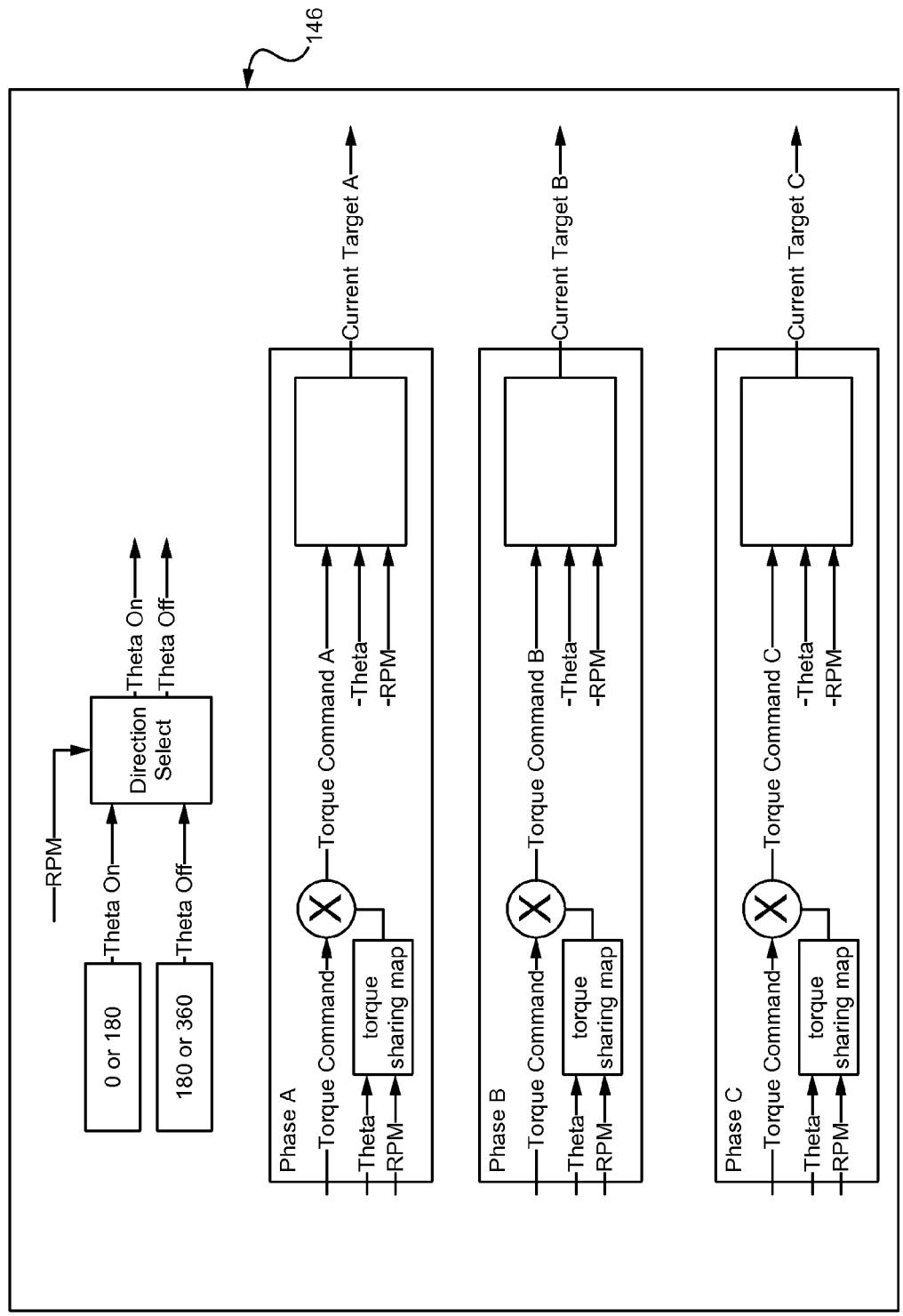
FIG. 7 is a schematic view of a current profiling module associated with the FPGA controller of FIG. 3.

As shown in FIG. 7, for example, the current profiling module 146 may generate a current target for each individual phase of the SR machine 110 based on one or more of the torque command, the observed rotor position and the observed rotor speed. Specifically, the current profiling module 146 may implement a torque sharing function, in the form of a preprogrammed torque sharing map, or the like, which correlates an observed rotor position with a corresponding torque scaling value. In alternative modifications, the torque sharing function may also correlate the observed rotor speed with a corresponding torque scaling value. The current profiling module 146 may apply the resulting torque scaling value to the torque command to generate a modified or scaled torque command. The scaled torque command as well as the observed rotor position, and in some cases, the observed rotor speed, may be used to determine an appropriate current target based on a preprogrammed torque-position lookup map, a torque-position-speed lookup map, or the like. As schematically illustrated in FIG. 7, the current shaping and torque scaling processes may be performed individually for each phase of the SR machine 110 but in parallel so as to simultaneously generate a current target for each phase per iteration.

Still referring to FIG. 7, the current profiling module 146 may generate theta-on/off angles that are specific to the mode of operation of the associated SR machine 110. Moreover, theta-on/off angles generated by the current profiling module 146 may be fixed according to the operating mode of the SR machine 110. In three-phase applications, for instance, if the SR machine 110 is in a motoring mode of operation, the theta-on angle may be fixed to 180° and the theta-off angle may be fixed to 360° for the first phase. Alternatively, if the SR machine 110 is in a generating mode of operation, the theta-on angle may be fixed to 0° and the theta-off angle may be fixed to 180° for the first phase. Correspondingly, the theta-on/off angles for the second phase may be shifted by 120° and the theta-on/off angles for the third phase may be shifted by 240°. The current profiling module 146 may further be configured to determine the present operating mode of the SR machine 110, or the rotational direction of the rotor 116, based on the rotor speed.

Figure 8:
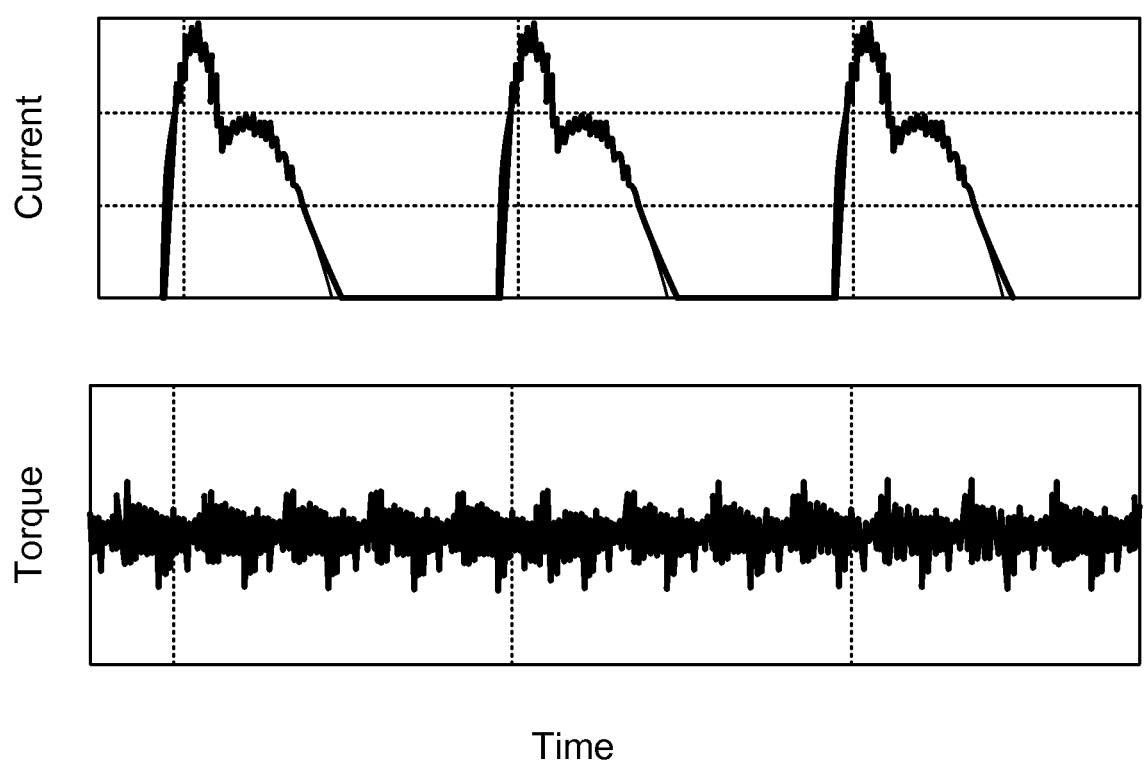
FIG. 8 is a graphical view of the machine current and the output torque of an SR machine being operated in part by the current profiling module of FIG. 7.

Thus, the current shaping along with the torque sharing function of the current profiling module 146 may shape the torque production per phase of the SR machine 110 so as to exhibit a combined torque output that is more constant overall, as illustrated by the waveforms in FIG. 8 for example. More specifically, as the torque output capacity of an SR machine 110 varies with machine inductance, and as the machine inductance varies with rotor position, the current profiling module 146 may be used to vary the torque output capacity based on rotor position. In addition, the overall operations of the current profiling module 146 may be constrained to a relatively small range of rotor speeds, for example, rotor speeds observed to range from approximately 0 RPM-200 RPM, 0 RPM-400 RPM, or the like. In still further modifications, additional scaling or additional axes may be incorporated into the lookup maps of the current profiling module 146 in order to further modify the current control parameters generated thereby.

Figure 9:
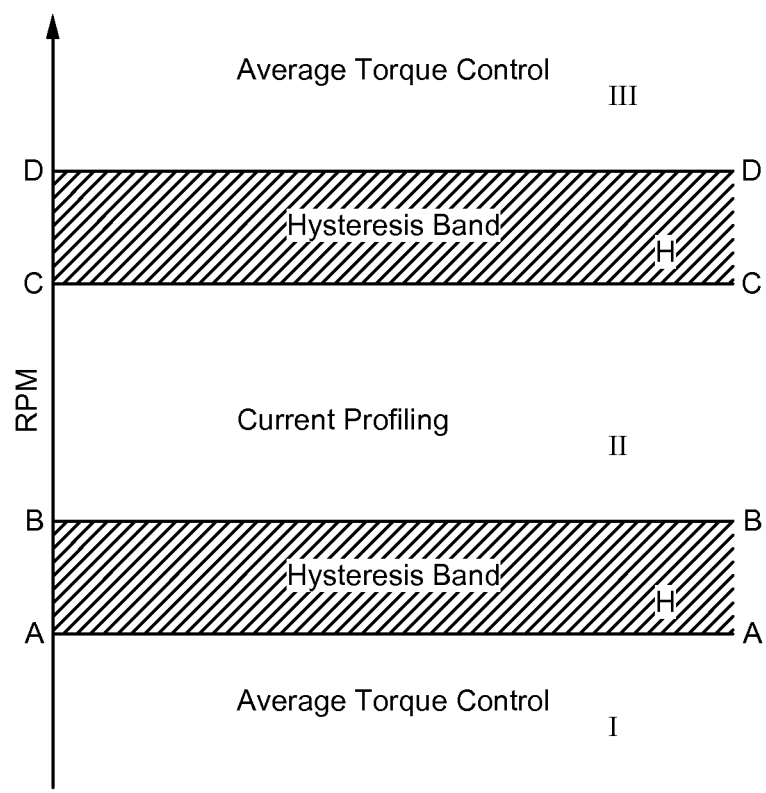
FIG. 9 is a graphical view rotor speed thresholds, regions and corresponding hysteresis bands as defined by a control select module associated with the FPGA controller of FIG. 3.

According to the FPGA controller 130 shown in FIG. 3, each of the first and second sets of current control parameters generated by the average torque control module 144 and the current profiling module 146, respectively, may be simultaneously communicated to the control select module 148 for further processing. The control select module 148 may serve to determine which of the two forms of control, for instance, via the average torque control or the current profiling, is best suited for the present operating conditions of the associated SR machine 110, and enable only one of the two available current control parameters associated with the selected form of control to be used to operate the SR machine 110. Moreover, the control select module 148 may select the appropriate form of control by referring to a plurality of preprogrammed rotor speed thresholds which define a plurality of rotor speed regions or ranges of rotor speeds, and determining the region corresponding to the absolute value of the observed rotor speed. As shown in the specific example of FIG. 9, the control select module 148 may establish four different rotor speed thresholds A, B, C and D which generally define a low-speed region I, a mid-speed region II and a high-speed region III. The control select module 148 may additionally define hysteresis bands H between each region. Furthermore, the control select module 148 may assign each speed region with one of the available forms of control. For example, the low-speed region I and the high-speed region III may be associated with control via the average torque control module 144, while the mid-speed region II may be associated with control via the current profiling module 146.

Accordingly, the control select module 148 may be configured to enable control via the average torque control module 144 if the observed rotor speed falls within either of the low-speed region I or the high-speed region III, or enable control via the current profiling module 146 if the observed rotor speed falls within the mid-speed region II. More particularly, the control select module 148 may output the first set of current control parameters if the average torque control module 144 is enabled, or output the second set of current control parameters if the current profiling module 146 is enabled, where each set of current control parameters may include a current target, a maximum current target and theta-on/off angles. Similarly, in other modifications, the control select module 148 may employ more than four rotor speed thresholds which may define more than three different speed regions so as to adapt the controller 130 for use with a broader range of operational speeds. Correspondingly, the control select module 148 may also employ less than four rotor speed thresholds to define less than three different speed regions and adapt the controller 130 for use with a narrower range of operational speeds.

Figure 10:
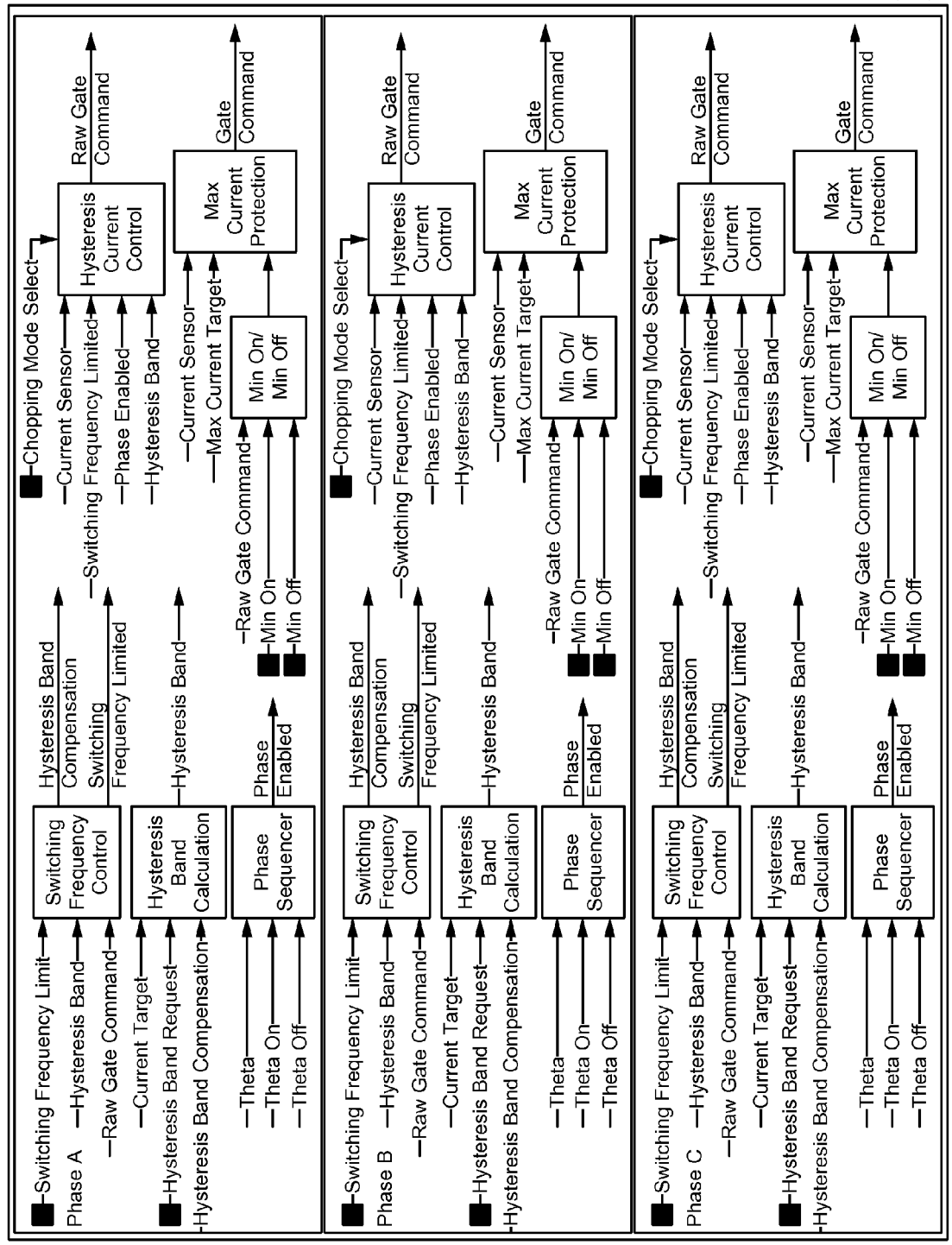
FIG. 10 is a schematic view of a current control module associated with the FPGA controller of FIG. 3.

As illustrated in the controller 130 of FIG. 3, the set of current control parameters that is enabled by the control select module 148 may be communicated to the current control module 150 for further processing. More specifically, the current control module 150 may be configured to generate gate command signals for driving each phase of the SR machine 110 based on the selected set of current control parameters, and communicate the gate command signals to the appropriate gates 132 of the electric drive 104. As shown in FIG. 10, for instance, the inputs to the current control module 150 may include a current target, a maximum current target and theta-on/off angles, as provided by the control select module 148, as well as the measured or estimated machine current, as determined by the sensor module 140, or the like. Based on comparisons between the desired or target current control parameters and the measured current control parameters, the current control module 150 may be able to request an adjusted current target, as well as a hysteresis band thereabout, per iteration.

As shown in FIG. 10, the current control module 150 may additionally include a current protection feature that is configured to monitor the machine current, for instance, based on current sensor readings, and compare the observed machine current with the maximum current target. If the observed machine current exceeds the maximum current target, the current control module 150 may be configured to disable one of the phases of the SR machine 110 for at least one fundamental cycle thereof. The current control module 150 may be configured to disable a phase of the SR machine 110 by disabling only one of the upper and lower gates 132 associated with the phase, or alternatively, by disabling both of the upper and lower gates 132 associated with the phase. The current control module 150 may further be configured to generate raw gate commands according to the operating conditions of the SR machine 110 and based on a desired chopping mode. Based on the requested chopping mode, for example, the current control module 150 may adjust the current supplied to the gates 132 of each phase of the SR machine 110 so as to operate the SR machine 110, for example, in any one of a single pulse mode, current regulation mode, hard chopping mode, a soft chopping mode, and the like.

Figure 11:
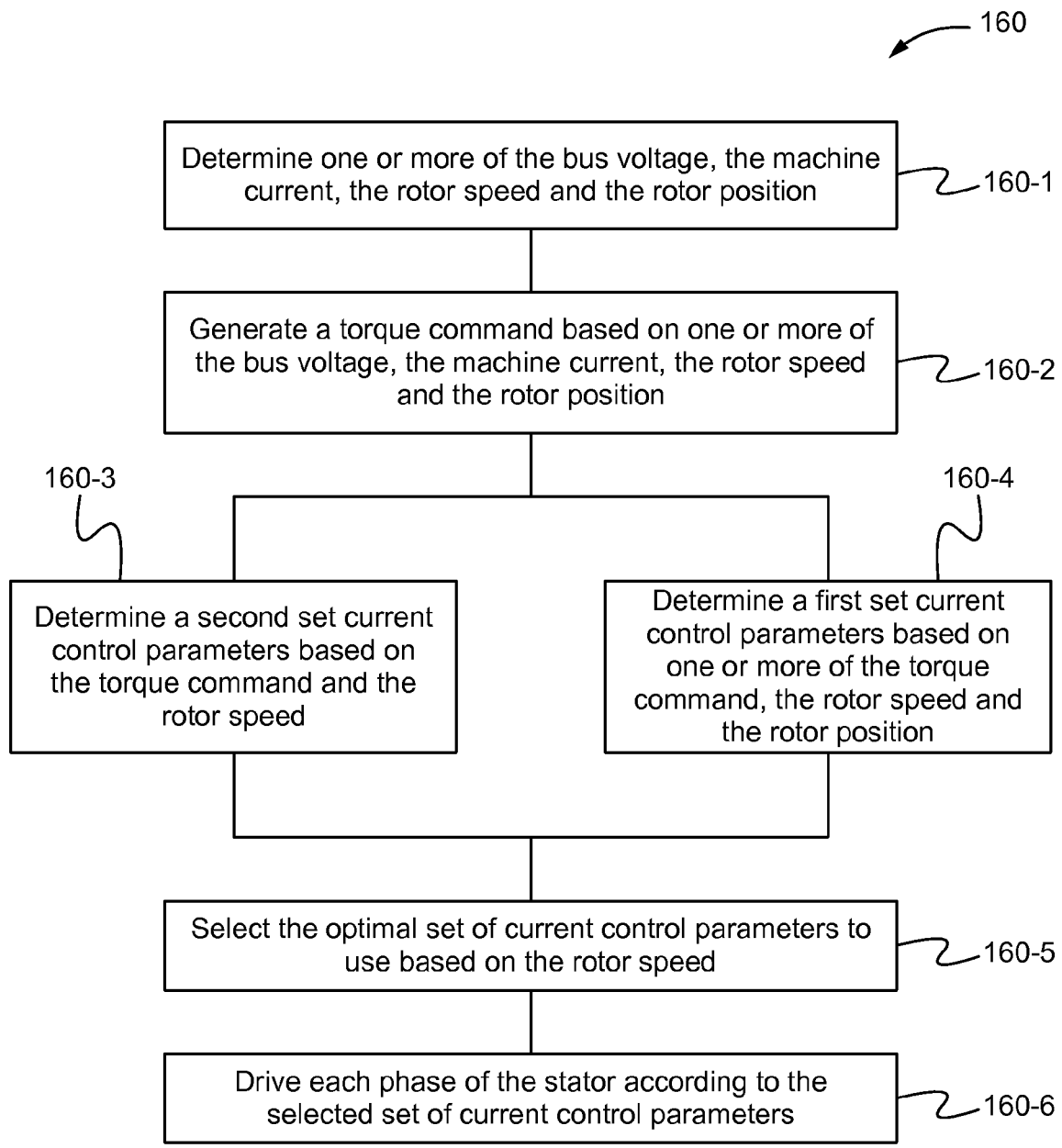
FIG. 11 is a diagrammatic view of one exemplary method of controlling an SR machine.

Now referring to FIG. 11, one exemplary method 160 or algorithm by which the controller 130 may be generally configured to control the electric drive 104 of an SR machine 110 is diagrammatically provided. Moreover, the method 160 may enable the controller 130 to perform one or more of the processes schematically illustrated for instance in FIG. 3. The method 160 or algorithm may be retrievably stored in executable code formats within a memory that is accessible by the controller 130 and configured to be executable based on predefined sets of conditionals. In addition, the method 160 may be preprogrammed using a controller 130 with a heightened capacity for parallel processing and executing multiple closed loop processes of the method 160 simultaneously per iteration thereof. For example, the controller 130 may at least partially comprise an FPGA, an ASIC, or any other programmable controller with increased bandwidth or throughput.

As shown in FIG. 11, the controller 130 in step 160-1 may be configured to determine the bus voltage, or the voltage across the common bus 120 associated with the stator 118 of the SR machine 110, the machine current, or the current through each phase of the stator 118, as well as the rotor speed and the rotor position of the SR machine 110. For example, the controller 130 may monitor one or more sensors 136 distributed throughout the machine 100 to directly measure the bus voltage, the machine current, the angular speed and/or position of the rotor 116 relative to the stator 118 of the SR machine 110, and the like. In other embodiments, the controller 130 may be configured to derive or internally estimate any one or more of the bus voltage, the machine current, the rotor speed, the rotor position, and the like. In step 160-2, the controller 130 may be configured to generate a torque command based one or more of the bus voltage, the machine current, the rotor speed and the rotor position determined during step 160-1. In the particular iteration demonstrated in FIG. 4, the controller 130 may implement a closed loop torque controller to generate a torque request based on one or more comparisons between a desired bus voltage and an observed bus voltage, a desired machine current and an observed machine current, a desired rotor speed and an observed rotor speed, and a desired rotor position and an observed rotor position. Alternatively, the controller 130 may employ an open loop control mode in determining the torque request based on one or more internally derived parameters. Step 160-2 may additionally limit the torque request according to predefined torque limit values and generate the torque command based on the limited torque request.

Based on at least the torque command and the rotor speed, the controller 130 during step 160-3 of FIG. 11 may be configured to determine a first set of current control parameters for controlling the SR machine 110. During step 160-4, the controller 130 may generate a second set of current control parameters for controlling the SR machine 110 based on one or more of the torque command, the rotor speed and the rotor position. As discussed with respect to the controller 130 of FIG. 3, each of the first and second sets of current control parameters may include, for example, a current target, a maximum current target, a theta-on angle, a theta-off angle, and any other parameter relevant to the control of the gates 132 associated with each phase of the SR machine 110. Moreover, the first set of current control parameters may be generated using an average torque control scheme, as shown in FIG. 5 for instance, while the second set of current control parameters may be generated using a current profiling control scheme, as shown in FIG. 7 for instance. Additionally, the controller 130 may be configured to perform at least steps 160-3 and 160-4 of FIG. 11 simultaneously or in parallel so as to reduce overall loop times.

Once both first and second sets of current control parameters are obtained, the controller 130 in step 160-5 may be configured to select the optimal scheme for controlling the SR machine 110 based on at least rotor speed. More specifically, the controller 130 may be configured to compare the observed rotor speed with a plurality of preprogrammed rotor speed thresholds to determine the control scheme best suited for the present operating conditions of the SR machine 110. For example, if the rotor speed is observed to be relatively low or high, the controller 130 may determine that the average torque control scheme is best suited to control the SR machine 110, and thus, drive the SR machine 110 using the first set of current control parameters generated during step 160-3. Alternatively, if the rotor speed is observed to be within a mid-speed range, the controller 130 may determine that the current profiling control scheme is best suited to control the SR machine 110, and thus, drive the SR machine 110 using the second set of current control parameters generated during step 160-4. More particularly, the controller 130 may generate gate command signals according to the enabled set of current control parameters, and communicate the command signals to the respective gates 132 of the electric drive 104 of the SR machine 110. In other modifications, however, the controller 130 may be configured to establish a fewer or a greater number of speed ranges with which the observed rotor speed is compared.

INDUSTRIAL APPLICABILITY

In general, the foregoing disclosure finds utility in various industrial applications, such as the farming, construction and mining industries in providing smoother and more efficient control of electric machines, or electric motors/generators, typically used in association with mobile machines, such as tractors, backhoe loaders, compactors, feller bunchers, forest machines, industrial loaders, skid steer loaders, wheel loaders, and the like, as well as with stationary machines configured to generate power. The disclosed controllers, control systems and methods may be applied to electrically driven machines having switched reluctance (SR) machines or other comparable electric machines commonly used in the art. More specifically, the present disclosure provides optimum control of the electric drives of SR machines and implements the control using controllers and/or control systems with parallel processing capabilities. By enabling or facilitating the parallel execution of multiple control processes of the SR machine, the present disclosure is able to significantly reduce loop times and alleviate throughput limitations of the prior art. Furthermore, by increasing controller bandwidth, the present disclosure greatly reduces the burden to the controller and the performance thereof.

From the foregoing, it will be appreciated that while only certain embodiments have been set forth for the purposes of illustration, alternatives and modifications will be apparent from the above description to those skilled in the art. These and other alternatives are considered equivalents and within the spirit and scope of this disclosure and the appended claims.

What is claimed is:

1. A control system for a switched reluctance (SR) machine having a rotor and a stator, the control system comprising:
    a converter circuit operatively coupled to the stator and including a plurality of gates in selective communication with each phase of the stator; and
    a controller in communication with each of the stator and the converter circuit and configured to execute two or more processes in parallel, the processes including:
    generating a torque command based on one or more of bus voltage, machine current, rotor speed and rotor position,
    determining a first set of current control parameters based on the torque command and the rotor speed,
    determining a second set of current control parameters based on one or more of the torque command, the rotor speed and the rotor position,
    selecting one of the first and second sets of current control parameters based on the rotor speed, and
    operating the gates according to the selected set of current control parameters.

2. The control system of claim 1, wherein the controller is configured to execute at least the processes of determining the first set of current control parameters and determining the second set of current control parameters in parallel.

3. The control system of claim 1, wherein the controller is at least partially implemented using one or more of a field programmable gate array (FPGA) and an application specific integrated circuit (ASIC) configured to facilitate parallel processing and substantially reduce loop times.

4. The control system of claim 1, wherein the controller generates the torque command based on one or more comparisons between the observed bus voltage, machine current, rotor speed and rotor position and the desired bus voltage, machine current, rotor speed and rotor position, respectively.

5. The control system of claim 4, wherein the controller further generates a torque request based on the one or more comparisons, limits the torque request based on the rotor speed, and generates the torque command based on the limited torque request.

6. The control system of claim 1, wherein the controller is configured to generate the torque command in one of a closed loop control mode and an open loop control mode.

7. The control system of claim 1, wherein each of the first and second sets of current control parameters includes a current target, a maximum current target, a theta-on angle and a theta-off angle.

8. The control system of claim 1, wherein the controller determines the first set of current control parameters by determining current control parameters best suited for each of a motoring mode of operation and a generating mode of operation, determining the mode of operation of the SR machine based on the torque command and the rotor speed, and selecting the current control parameters corresponding to the detected mode of operation.

9. The control system of claim 1, wherein the stator is a three-phase stator, the second set of current control parameters including a fixed theta-on angle of 180° and a fixed theta-off angle of 360° for a first phase of the stator if the SR machine is in a motoring mode of operation, and including a fixed theta-on angle of 0° and a fixed theta-off angle of 180° for the first phase of the stator if the SR machine is in a generating mode of operation, the corresponding theta-on and theta-off angles for a second phase of the stator being shifted by 120° and the corresponding theta-on and theta-off angles for a third phase of the stator being shifted by 240°.

10. The control system of claim 1, wherein the controller generates the second set of current control parameters by scaling the torque command for each phase of the stator based on one or more of the rotor speed, the rotor position and a preprogrammed torque sharing function, and generates a current target for each phase of the stator based on one or more of the scaled torque command, the rotor speed, the rotor position and a predefined lookup map, the torque sharing function being configured to modify the current in each phase of the stator in a manner which more evenly distributes torque production therebetween and minimizes torque ripple.

11. The control system of claim 1, wherein the controller compares an absolute value of the rotor speed to a plurality of rotor speed thresholds configured to establish at least a first speed region and a second speed region, the controller selecting the first set of current control parameters for controlling the SR machine if the rotor speed falls within the first speed region, the controller selecting the second set of current control parameters for controlling the SR machine if the rotor speed falls within the second speed region.

12. A current controller for an electric drive of a switched reluctance (SR) machine having a rotor and a stator, the current controller comprising:
    a torque control module configured to generate a torque command based on one or more of bus voltage, machine current, rotor speed and rotor position;
    an average torque control module configured to determine a first set of current control parameters based on the torque command and the rotor speed;
    a current profiling module configured to determine a second set of current control parameters based on one or more of the torque command, the rotor speed and the rotor position;
    a control select module configured to select one of the first and second sets of current control parameters based on the rotor speed; and
    a current control module configured to selectively drive a plurality of gates associated with each phase of the stator according to the selected set of current parameters.

13. The controller of claim 12, wherein at least the torque control module, the average torque control module and the current profiling module are implemented using one of a field programmable gate array (FPGA) and an application specific integrated circuit (ASIC) configured to facilitate parallel processing thereof and substantially reduce loop times.

14. The controller of claim 12, wherein the torque control module compares one or more of the observed bus voltage, machine current, rotor speed and rotor position to one or more of the desired bus voltage, machine current rotor speed and rotor position, respectively, the torque control module further generating a torque request based on the one or more comparisons, limiting the torque request based on the rotor speed, and generating a torque command based on the limited torque request.

15. The controller of claim 12, wherein the average torque control module determines current control parameters best suited for each of a motoring mode of operation and a generating mode of operation, determines the mode of operation of the SR machine based on the torque command and the rotor speed, and selects the current control parameters corresponding to the detected mode of operation.

16. The controller of claim 12, wherein the current profiling module is configured to output fixed theta-on and theta-off angles for each phase of the stator based on a detected mode of operation of the SR machine.

17. The controller of claim 12, wherein the stator is a three-phase stator, the current profiling module being configured to output a fixed theta-on angle of 180° and a fixed theta-off angle of 360° for a first phase of the stator if the SR machine is in a motoring mode of operation, and output a fixed theta-on angle of 0° and a fixed theta-off angle of 180° for the first phase of the stator if the SR machine is in a generating mode of operation, the corresponding theta-on and theta-off angles for a second phase of the stator being shifted by 120° and the corresponding theta-on and theta-off angles for a third phase of the stator being shifted by 240°.

18. The controller of claim 12, wherein the current profiling module is preprogrammed with a torque sharing function configured to modify the current in each phase of the stator in a manner which more evenly distributes torque production therebetween and minimizes torque ripple, the current profiling module being configured to scale the torque command for each phase of the stator based on one or more of the rotor speed, the rotor position and the torque sharing function, and generate a current target for each phase of the stator based on one or more of the scaled torque command, the rotor speed, the rotor position and a predefined torque-speed-position lookup map.

19. The controller of claim 12, wherein the control select module compares an absolute value of the rotor speed to a plurality of rotor speed thresholds configured to establish at least a first speed region and a second speed region, the control select module selecting the first set of current control parameters for controlling the SR machine if the rotor speed falls within the first speed region, the control select module selecting the second set of current control parameters for controlling the SR machine if the rotor speed falls within the second speed region.

20. The controller of claim 12, wherein the torque control module is operated in one of a closed loop control mode and an open loop control mode.

21. A method of controlling a switched reluctance (SR) machine having a rotor and a stator, the method comprising the steps of:
 determining one or more of bus voltage, machine current, rotor speed and rotor position of the SR machine;
 generating a torque command based on one or more of the bus voltage, the machine current, the rotor speed and the rotor position;
 determining a first set of current control parameters based on the torque command and the rotor speed;
 determining a second set of current control parameters based on one or more of the torque command, the rotor speed and the rotor position;
 selecting one of the first and second sets of current control parameters based on the rotor speed; and
 selectively driving a plurality of gates associated with each phase of the stator according to the selected set of current control parameters.

22. The method of claim 21, wherein at least the steps of determining the first set of current control parameters and determining the second set of current control parameters are performed in parallel.

23. The method of claim 21, wherein the step of generating the torque command is performed in one of a closed loop control mode and an open loop control mode.

24. The method of claim 21, wherein the step of generating the torque command further includes comparing one or more of the observed bus voltage, machine current, rotor speed and rotor position to one or more of the desired bus voltage, machine current rotor speed and rotor position, respectively.

25. The method of claim 24, wherein the step of generating the torque command further includes generating a torque request based on the one or more comparisons, limiting the torque request based on the rotor speed, and generating a torque command based on the limited torque request.

26. The method of claim 21, wherein each of the first and second sets of current control parameters includes a current target, a maximum current target, a theta-on angle and a theta-off angle.

27. The method of claim 21, wherein the step of determining the first set of current control parameters further includes determining current control parameters best suited for each of a motoring mode of operation and a generating mode of operation, determining the mode of operation of the SR machine based on the torque command and the rotor speed, and selecting the current control parameters corresponding to determined mode of operation.

28. The method of claim 21, wherein the first set of current control parameters are determined based on torque-speed lookup maps, and the second set of current control parameters are determined based on torque-speed-position lookup maps.

29. The method of claim 21, wherein the second set of current control parameters includes fixed theta-on and theta-off angles for each phase of the stator, the controller determining the fixed theta-on and theta-off angles based on a detected mode of operation of the SR machine.

30. The method of claim 21, wherein the stator is a three-phase stator, the second set of current control parameters including a fixed theta-on angle of 180° and a fixed theta-off angle of 360° for a first phase of the stator if the SR machine is in a motoring mode of operation, and including a fixed theta-on angle of 0° and a fixed theta-off angle of 180° for the first phase of the stator if the SR machine is in a generating mode of operation, the corresponding theta-on and theta-off angles for a second phase of the stator being shifted by 120° and the corresponding theta-on and theta-off angles for a third phase of the stator being shifted by 240°.

31. The method of claim 21, wherein the step of determining the second set of current control parameters further includes scaling the torque command for each phase of the stator based on one or more of the rotor speed, the rotor position and a preprogrammed torque sharing function, and generating a current target for each phase of the stator based on one or more of the scaled torque command, the rotor speed, the rotor position and a predefined torque-speed-position lookup map, the torque sharing function being configured to modify the current in each phase of the stator in a manner which more evenly distributes torque production therebetween and minimizes torque ripple.

32. The method of claim 21, wherein the step of selecting one of the first and second sets of current control parameters further includes comparing an absolute value of the rotor speed to a plurality of rotor speed thresholds configured to establish a first speed region and a second speed region, the first set of current control parameters being selected to control the SR machine if the rotor speed falls within first speed region, the second set of current control parameters being selected to control the SR machine if the rotor speed falls within the second speed region.

* * * * *